United States Patent Office 2,727,903
Patented Dec. 20, 1955

2,727,903

ANTHRAQUINONE DYESTUFFS

David I. Randall and Edgar E. Renfrew, Easton, Pa., assignors to General Aniline & Film Corporation, New York, N. Y., a corporation of Delaware No Drawing. Application December 31, 1952,
Serial No. 329,107

6 Claims. (Cl. 260—372)

This invention relates to the production of a new series of anthraquinone dyestuffs, and more particularly to unsulfonated compounds having the following general formula:

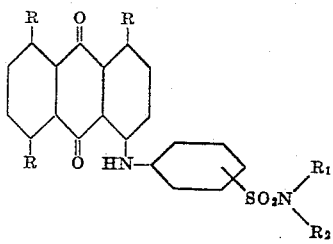

wherein one R stands for the group

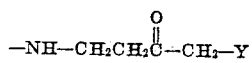

$-NH-CH_2CH_2\overset{O}{\overset{\|}{C}}-CH_2-Y$ and the other R's stand for H, X is selected from the group consisting of H, OH, alkyl and acyloxy, and $R_1$ and $R_2$ are selected from the group consisting of H, alkyl, hydroxyalkyl, hydroxyalkoxyalkyl, hydroxypolyalkoxyalkyl, cyanoalkyl and, when taken together,

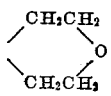

The problem of providing acid gas resistant blue and blue-green dyestuffs for cellulose acetate rayon fibers and other fibrous material having a basis of polymeric material has long been recognized. Other important properties highly desirable in such dyestuffs include fastness to light and to washing, in addition to good substantivity for the fiber. It has been found that dyestuffs of the above formula provide a series of blue and blue-green colors on fibrous and other material which have surprisingly good light-, wash- and acid gas-fastness properties in addition to a good substantivity and an improved behavior towards pH changes. In addition to cellulose acetate the deystuffs of this invention may be employed for coloring other polymeric material in bulk or fiber form, as for example nylon, Orlon, Dacron, Acrilan, Dynel and the like.

The dyestuffs of this invention may be readily prepared by reacting a 1-, 5- or 8- amino-4-sulfamylbenzeneamino anthraquinone with a vinyl ketone of the formula

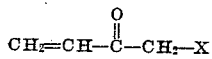

in which X has the values given above. It will thus be seen that this reaction proceeds by way of addition. Operative vinyl ketones of the above formula in which X is acyloxy (derived from acetic, propionic, butyric, isobutyric, valeric, caprylic, capric, lauric, myristic, palmitic, stearic acids and the like, but preferably acetic) their methods of production and reaction with active-hydrogen containing compounds including aminoanthraquinones are disclosed in the copending application Serial No. 329,105 of Wilkinson and Renfrew entitled "Addition Products of 1-Acyloxy-3-Buten-2-Ones" filed on even date herewith. Operative 1-, 5- or 8-amino-4-sulfamylbenzeneamino anthraquinones and their methods of production are disclosed in the copending application Serial No. 329,106 of Hoefle, Randall and Renfrew entitled "Anthraquinone Dyestuffs" filed on even date herewith. $R_1$ and $R_2$ in the instant invention may be hydrogen, methyl, ethyl, hydroxyethyl, hydroxyethoxyethyl, hydroxydiethoxyethyl, hydroxytriethoxyethyl, cyanoethyl,

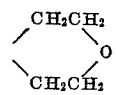

when taken together, etc. In addition to the values above-mentioned, X may be methyl, ethyl and the like.

It will, of course, be understood that other inert substituents may be present in the benzene nucleus of the 4-sulfamylbenzeneamino group and in the anthraquinone nucleus, provided they do not detract materially from the desired properties of the final dyestuff.

The following examples serve to illustrate the invention but they are not intended to limit it thereto. Parts are by weight unless otherwise indicated.

Example 1

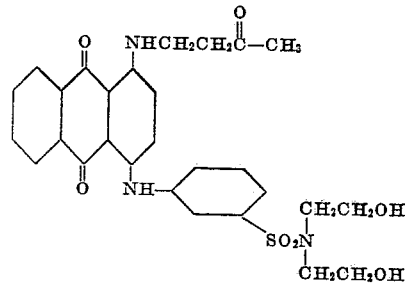

In a vessel equipped with a stirrer, a thermometer, a heater and a condenser were placed 144 parts $N^3$-[4-aminoanthraquinonyl] $N^1$, $N^1$-bis(2-hydroxyethyl) metanilamide and 1000 parts glacial acetic acid. Then 50 parts methyl vinyl ketone were added. The temperature was raised to 90° C. and held there while stirring for one hour. Another 32 parts of methyl vinyl ketone were then added. Heating and stirring was continued for four more hours, whereupon the reaction mixture was filtered through a sintered glass funnel. The cake was washed well with water and dried.

Cellulose acetate fiber, when dyed by this product shows strong attractive greenish-blue shades of excellent fastness to light, washing and combustion gas fumes.

Example 2

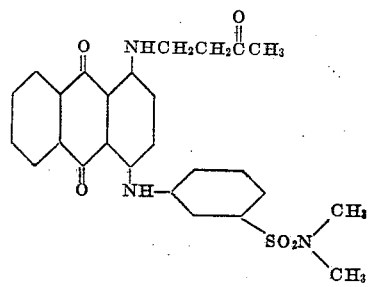

In a vessel equipped as in Example 1 were placed 14.0 parts $N^3$-[4-aminoanthraquinonyl]-$N^1$, $N^1$-dimethylmetanilamide and 100 parts glacial acetic acid. Then 5.0 parts of methyl vinyl ketone were added. The temperature was raised to 90° C. and held there while stirring for one hour. An additional 2.0 parts of methyl vinyl ketone were then added to ensure a sufficient excess. Heating and stirring were continued for four more hours. The mixture was allowed to cool, and the portion which settled out was collected on a glass filter. The cake was washed with water until the washings were clear and nearly neutral, whereupon it was dried.

Cellulose acetate fibers when dyed by this product show bright greenish-blue shades of surprisingly good fastness to light, washing and the action of combustion fumes.

*Example 3*

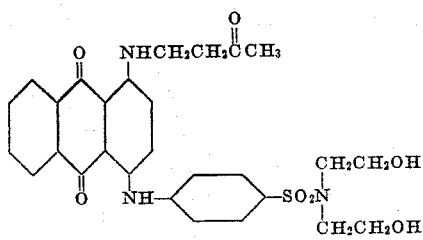

By replacing the $N^3$-[4-aminoanthraquinonyl]-$N^1,N^1$-bis (2-hydroxyethyl) metanilamide in Example 1 with an equivalent amount of $N^4$-[4-aminoanthraquinonyl]-$N^1,N^1$-bis(2-hydroxyethyl) sulfanilamide, and following the procedure as described in Example 1, there was obtained a dyestuff which gave slightly redder shades of blue than the product of the cited example. All other fastness properties were very similar.

*Example 4*

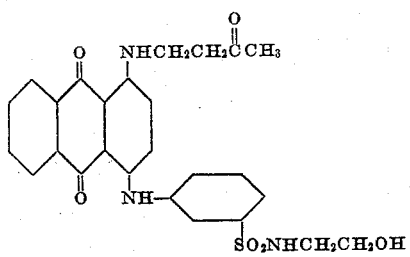

By replacing the $N^3$-[4-aminoanthraquinonyl]-$N^1,N^1$-bis(2-hydroxyethyl) metanilamide in Example 1 with an equivalent amount of $N^3$-[4-aminoanthraquinonyl]-$N^1$-(2-hydroxyethyl) metanilamide and following the procedure as described in Example 1, there was obtained a greenish-blue dyestuff with properties very similar to those of the product of Example 1.

*Example 5*

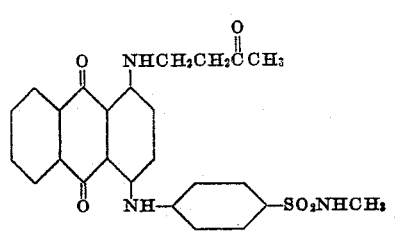

By replacing the $N^3$-[4-aminoanthraquinonyl]-$N^1,N^1$-bis(2-hydroxyethyl) metanilamide in Example 1 with an equivalent portion of $N^4$-[4-aminoanthraquinonyl]-$N^1$-methylsulfanilamide and following the procedure as described in that example, there was obtained a dyestuff which colored cellulose acetate in slightly redder shades of greenish blue than the product of Example 1. The fastness properties were very similar.

*Example 6*

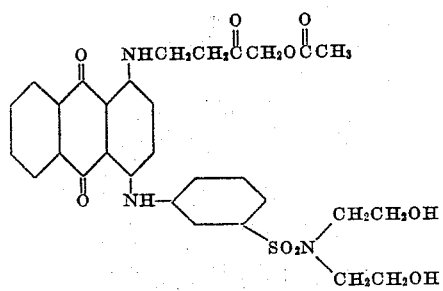

In a vessel equipped with a stirrer, a thermometer, a heater, and a condenser were placed 482 parts $N^3$-[4-aminoanthraquinonyl]-$N^1,N^1$-bis (2-hydroxyethyl) metanilamide and 1500 parts glacial acetic acid. At 85° C. over a period of ten minutes there was added while stirring 192 parts 1-acetoxy-3-butene-2-one. After two hours at 85–90° C. the reaction mixture was poured slowly into 3500 parts water. The material which precipitated was isolated by filtration, washed with water, and dried.

Dyeings of the product on cellulose acetate are greenish-blue, being quite similar to the product of Example 1 in both shade and fastness properties.

The 1-acetoxy-3-butene-2-one can be prepared by heating 1,4-butynediol in acetic acid, allowing to cool, adding mercuric sulfate and heating cautiously until the exothermic rearrangement is initiated and completed. The catalyst can be removed by filtration if desired, and the solution of 1-acetoxy-3-butene-4-one may then be used as described above.

*Example 7*

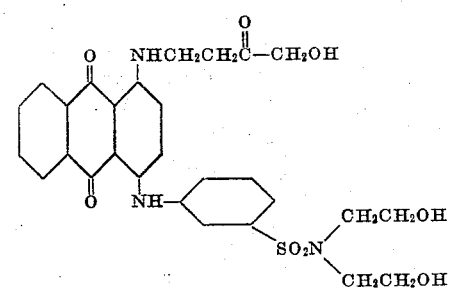

By replacing the 1-acetoxy-3-butene-2-one in Example 6 with an equivalent portion of 1-hydroxy-3-butene-2-one, preferably dissolved in glacial acetic acid, and conducting the reaction as described in that example, there was obtained a product which dyed cellulose acetate in greenish-blue shades of excellent fastness properties, being similar to the product of Example 6.

Various modifications of this invention will be obvious to a person skilled in the art and such variations and modifications are to be regarded as within the purview of this application and the spirit and scope of the appended claims.

We claim:
1. A compound of the formula

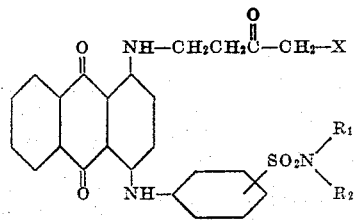

wherein X is selected from the group consisting of H, OH, lower alkyl and acyloxy, and $R_1$ and $R_2$ are selected from the group consisting of H, lower alkyl and hydroxy alkyl.
2. The compound of the formula
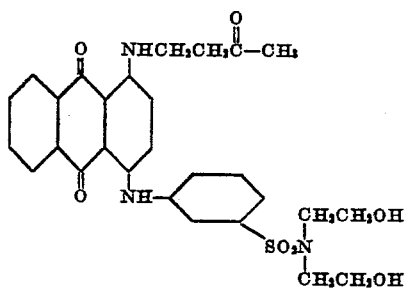
3. The compound of the formula
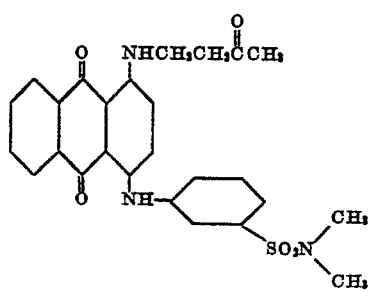
4. The compound of the formula
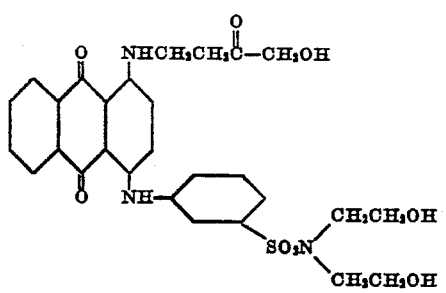
5. The compound of the formula
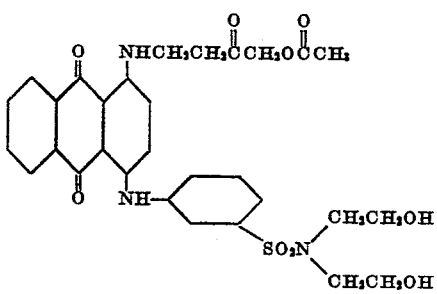
6. The compound of the formula
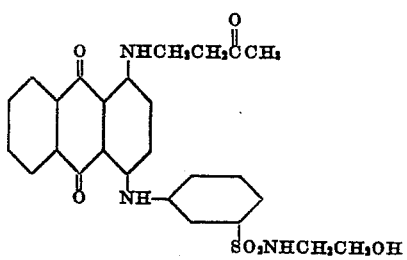
References Cited in the file of this patent
UNITED STATES PATENTS
| | | |
|---|---|---|
| 2,029,258 | Diefenbach et al. | Jan. 28, 1936 |
| 2,304,889 | Dickey et al. | Dec. 15, 1942 |
| 2,430,771 | Kern | Nov. 11, 1947 |
| 2,480,269 | Seymour et al. | Aug. 30, 1949 |